US007784756B1

(12) United States Patent
Wentworth

(10) Patent No.: US 7,784,756 B1
(45) Date of Patent: Aug. 31, 2010

(54) PLASTIC BEAM COVER

(75) Inventor: Robert J. Wentworth, Farmington Hills, MI (US)

(73) Assignee: Motor City Wash Works, Inc., Northville, MI (US)

(*) Notice: Subject to any disclaimer, the term of this patent is extended or adjusted under 35 U.S.C. 154(b) by 0 days.

(21) Appl. No.: 12/774,127

(22) Filed: May 5, 2010

Related U.S. Application Data

(62) Division of application No. 12/033,185, filed on Feb. 19, 2008, now Pat. No. 7,753,326.

(51) Int. Cl.
*A47F 5/00* (2006.01)
(52) U.S. Cl. .................... 248/222.12; 248/345.1; 52/650.1; 52/314; 134/114; 134/201
(58) Field of Classification Search ............ 52/DIG. 12, 52/173.1, 287.1, 311; 16/2
See application file for complete search history.

(56) References Cited

U.S. PATENT DOCUMENTS

| 2,564,386 | A | * | 8/1951 | Webb ............................. 5/93.1 |
| 3,931,965 | A | * | 1/1976 | Grant ........................... 473/493 |
| 4,513,467 | A | * | 4/1985 | Roncaglione ................ 15/53.3 |
| 4,585,131 | A |   | 4/1986 | Crossman et al. |
| 4,719,731 | A | * | 1/1988 | Ravotti et al. ................. 52/239 |
| 4,858,413 | A | * | 8/1989 | Grushka ........................ 108/27 |
| 4,969,272 | A | * | 11/1990 | Schleeter et al. .............. 34/666 |
| 5,075,141 | A | * | 12/1991 | Sudmann ...................... 428/14 |
| 5,326,187 | A | * | 7/1994 | St. Marie et al. ............ 403/402 |
| 5,482,238 | A | * | 1/1996 | Kreiter .................... 248/222.12 |
| 5,904,022 | A | * | 5/1999 | Zadok ......................... 52/650.1 |
| 6,192,643 | B1 | * | 2/2001 | Zadok ......................... 52/648.1 |
| 6,374,555 | B1 |   | 4/2002 | Gusler |
| 7,007,437 | B2 |   | 3/2006 | Thomas |
| 7,530,550 | B2 | * | 5/2009 | Fattori ...................... 256/65.05 |
| 2001/0022056 | A1 | * | 9/2001 | Gifford ........................ 52/311.1 |
| 2006/0157093 | A1 | * | 7/2006 | Belanger .................... 134/123 |
| 2007/0209129 | A1 |   | 9/2007 | Turner |

* cited by examiner

*Primary Examiner*—Richard E Chilcot, Jr.
*Assistant Examiner*—Alp Akbasli
(74) *Attorney, Agent, or Firm*—Dickinson Wright PLLC

(57) ABSTRACT

A vehicle wash system having a plurality of vehicle treatment components includes with at least one support member. The support member is constructed of a base material and has an outer surface. An elongated cover includes an interior surface and an exterior surface. The interior surface of the elongated cover has a first color and a size and shape that substantially matches the outer surface of the support member. The elongated cover is readably engageable with the support member to protect it from contact with fluid and debris. The elongated cover is formed of a readably cleanable material such that fluid and debris can be easily wiped off of its exterior surface.

21 Claims, 1 Drawing Sheet

PLASTIC BEAM COVER

CROSS-REFERENCE TO RELATED APPLICATION

The present invention claims priority from Division of U.S. patent application Ser. No. 12/033,185, filed Feb. 19, 2008, now U.S. Pat. No. 7,753,326 and entitled "Plastic Beam Cover".

BACKGROUND OF THE INVENTION

1. Field of the Invention

The present invention relates generally to a vehicle wash system and a mechanism that allows for easy cleaning and color coordination of various components of the system. More specifically, the present invention relates to a vehicle wash system with covers or skins for various structural components of the vehicle wash system that are readily removable to allow for easy customization of the component colors and that can be easily cleaned or replaced.

2. Description of the Prior Art

It is well known in the prior art to have support members of equipment or components in a vehicle wash system that are color coordinated. The color coordination leads to an aesthetically pleasing vehicle wash system. It is also desirable to color the components in a vehicle washing system for branding purposes. Existing ways for coloring the equipment of the components of a vehicle wash system include painting or otherwise coloring the components before installation. Each of these processes is labor intensive and time consuming. They also increase the cost of equipment. Additionally, in order to change the colors of the components once they have been installed, the vehicle wash system must be shut down in order repaint or otherwise color the components. Alternatively, the components have to be entirely removed or replaced, which is cost prohibitive.

Additionally, it is known that the vehicle washing process is a harsh environment for the various components utilized in the vehicle washing system. The components in the vehicle wash system are regularly coated with water, soap, wax, and/or various other chemicals, not to mention dirt from the vehicles that are the subjects of the vehicle washing process. These can all adhere to various surfaces of the components, making the facility look unclean. Additionally, regular contact with these fluids and other debris can also cause corrosion of the components. In an effort to combat potential corrosion, various vehicle wash facilities powder coat the support members of many components. The components are then painted to improve the aesthetics. However, the painted support members are difficult to clean as the fluid and debris tends to adhere to their surfaces. Additionally, because of the corrosive environment, the paint tends to chip and wear or the color can fade, which also requires repainting. This is disadvantageous for the reasons discussed above.

As such, it is desirable to have an improved vehicle wash system that is aesthetically pleasing, cost efficient, and easy to clean.

SUMMARY OF THE INVENTION AND ADVANTAGES

It is an advantage of the present invention to provide a mechanism that allows the color of various structural components in a vehicle wash system to be easily changed.

It is another advantage of the present invention to provide a mechanism for covering the various structural components in a vehicle wash system that can be easily removed and replaced as necessary.

It is still another advantage of the present invention to provide a mechanism that allows for easy cleaning of the surfaces of various structural components in a vehicle wash system.

It is a further advantage of the present invention to provide a mechanism that decreases the cost to clean and/or change the color of the various structural components in a vehicle wash system.

It is still a further advantage of the present invention to provide a mechanism for covering the various structural components in a vehicle wash system that enhances the aesthetic appearance of the components.

It is a related advantage of the present invention to provide a mechanism that allows the various structural components in a vehicle wash system to be easily branded based on the operator's preference.

It is yet another advantage of the present invention to provide a mechanism that protects the various structural components in a vehicle wash system from corrosion.

In accordance with the above and the other advantages of the present invention, a vehicle wash system having a plurality of vehicle treatment components is provided. One of the plurality of vehicle treatment components includes at least one support member, which is constructed of a corrosive base material and has an outer surface. The outer surface of the at least one support member is intended to mate with a first cover member or skin having an interior surface and an exterior surface. The first cover member has a first color and has a size and shape that substantially overlies the outer surface of the at least one support member. The first cover member is releasably engageable with the support member to protect it from engagement with fluid and debris. The first cover member is formed of a readily cleanable material such that fluid and debris can be easily wiped off of its exterior surface.

The present invention also includes a method of protecting a support member for a vehicle treatment component in a vehicle wash system where the support member has an exterior surface that extends between a pair of side peripheral edges. The method includes disposing the interior surface of a cover member over the exterior surface of the at least one support member to provide protection therefore. Next, the cover member is secured onto the support member with a quick release attachment mechanism that engages side edges of the at least one support member.

Additionally, the present invention includes a method of protecting an open area between a pair of spaced apart support members for a vehicle treatment component in a vehicle wash system. One of the spaced apart support members includes a pair of opposing edges. The other of the spaced apart support members includes a pair of opposing edges. A first end of a first panel member is releasably mated with one of the peripheral edges of one of the support members. Next, a second end of the panel member is releasably mated with another of the peripheral edges to cover one side of an open area between the spaced apart members. Thereafter, a second panel member is releasably mated with the other peripheral edges of the spaced apart support members to cover the other side of the open area between the spaced apart members. The panels fully cover the open area that may be used to house controls, wires, and other items that are preferably located out of sight.

As such, the subject invention provides for an aesthetically pleasing, color coordinated vehicle wash system that is cost efficient and easy to clean.

These and other features and advantages of the present invention will become apparent to one of ordinary skill in the art from the following description of the invention, when viewed in accordance with the accompanying drawings and appended claims.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
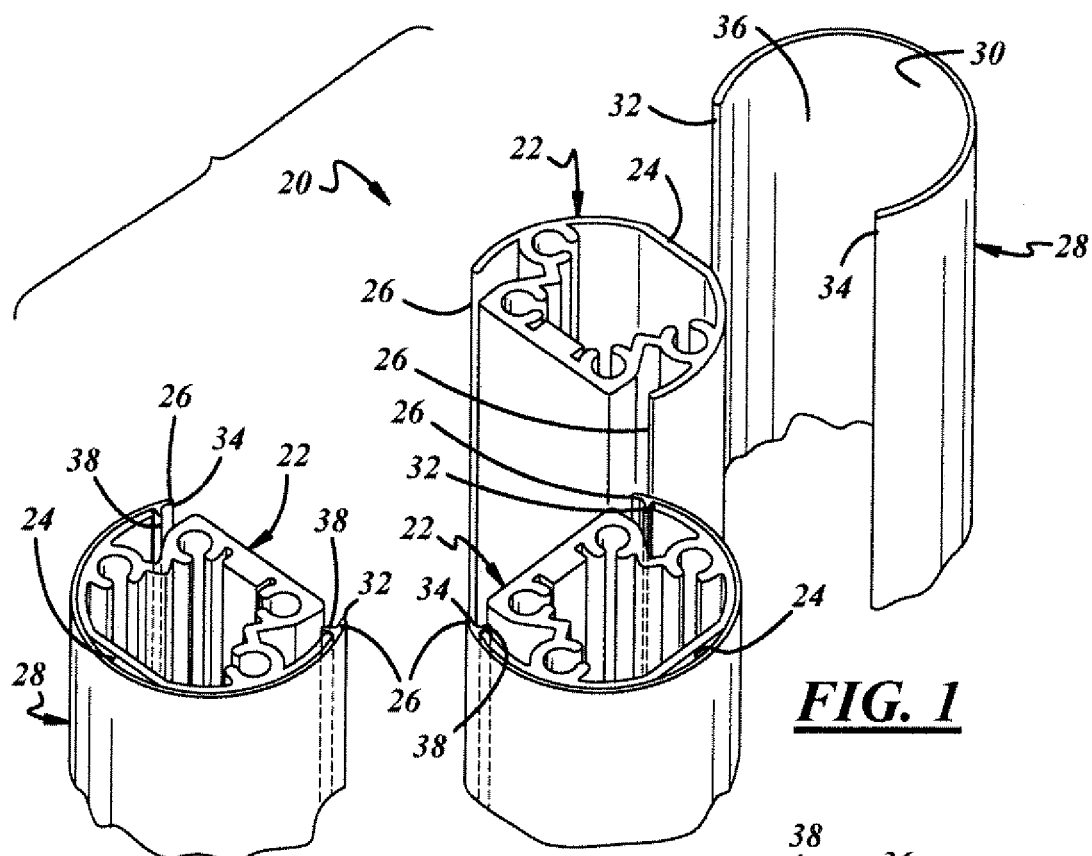
FIG. 1 is a partial perspective and exploded view of various embodiments of the present invention.

Referring to the Figures, the present invention is intended for use in a vehicle washing system, as will be understood by one of ordinary skill in the art. It will also be understood by one of ordinary skill in the art, however, that the disclosed invention can be utilized in a variety of other applications.

Referring to the Figures, wherein like numerals indicate corresponding parts throughout the several views, a vehicle wash system 20 is generally shown.

The vehicle wash system 20 includes a plurality of vehicle treatment apparatus or components, such as a cloth roll, a top wheel, a rinse manifold, a friction curtain and/or a dryer. Obviously, the present invention also relates to other types of vehicle treatment apparatus. Each of the vehicle treatment apparatus includes a plurality of support members that are subjected to various fluids, such as water and chemicals, as well as dirt and debris during a vehicle cleaning process. The support members of each of these treatment apparatus are typically constructed of a base material such as a metal and may be corrosive. However, they may also be formed of other materials known in the art. In many instances, the support members are unpainted or painted a particular color. Some of the vehicle treatment apparatus includes a plurality of support members that are spaced apart. It will be appreciated that the support members can have an almost unlimited number of shapes. For example, they may be elongated or short. They may alternatively be wide or narrow. The configuration of the support members is not critical.

The present invention relates to a mechanism for covering and protecting the plurality of support members to prevent corrosion, to assist in cleaning, and to improve aesthetics. For purposes of illustration, a plurality of generic support members, identified by reference number 22, are shown and described. However, it will be appreciated that the present invention applies equally to the support members for any vehicle treatment apparatus in a vehicle washing system. The present invention can also be used for other structures in a vehicle wash facility, such as signs or the like. It will also be understood that the present invention can be utilized for other applications besides vehicle washing processes.

As exemplarily shown in the Figures, the plurality of support members 22 are elongated and include an exterior surface 24 that extends longitudinally between upper and lower support ends 26. In accordance with the present invention, a cover member or skin 28 includes an interior surface 34 and an exterior surface 24. The cover member 28 also includes upper and lower ends 26. The cover member 28 is preferably constructed of readably cleanable material, such as a plastic. The cover member or skin 28 is also preferably flexible to assist in its application to the support member 22, as discussed below. However, it will be understood that the cover can be formed of a variety of other suitable materials. Indeed, the cover member 28 can also be construed of a colored tape. The cover member 28 has a color, which may be any suitable color to meet an operator's needs. For example, an operator may desire certain colors for branding and marketing purposes.

The cover member 28 is readably engageable with and releasable from an exterior surface 24 of one of the plurality of support members 22 to protect the support member 22 from corrosion as well as to preserve the aesthetics of the support members. The cover member 28 extends longitudinally from an upper portion to a lower portion. The cover member 28 also extends latitudinally from a first side or edge 32 to a second side or edge 34 to define a hollow interior 36. The interior surface 30 mates with the exterior surface 24 of the support member 22 to protect the support member 22. The cover member 28 is illustrated having a generally "C"-shaped configuration to match the exterior surface 24 of the support member 22. However, it will be appreciated that the cover member 28 can have a multitude of different sizes, shapes, configurations, and lengths to match the dimensions of the support member 22 it is intended to cover. The cover member or skin 28 can have a different shape than the exterior surface 24 of the support member 22 so long as it overlies it; it does not need to match it. The cover member 28 is intended to cover all of the exterior surface 24 of the support member 22. However, it can be configured to cover less than all of the support member 22 as desired.

The cover member 28 preferably includes a quick release mechanism that allows it to quickly snap on and off of the support member 22. In one embodiment, the cover member 28 includes a plurality of support lips 38 that extend radially inward from the interior surface 30 of the cover member 28. Each of the lips are disposed adjacent each of the first and second sides or edges 32, 34 and extend along the length thereof for mating with the peripheral support ends 26 of the support member 22 to secure the cover member 28 to the support member 22. The support lips 38 allow the cover member 28 to snap onto the support member 22 to protect the support member 22 and make the support member 22 any color. As discussed above, the cover member 28 is preferably formed of a flexible material, which assists in allowing it to be easily placed on and taken off the exterior surface 24 of the support member 22. The cover member 28 is easily removable from the support member 22 for replacing the old cover member 28 with a new cover member 28 having a new shell color. It will be understood by one of ordinary skill in the art that the cover member can "snap on" and "snap off" of engagement with the support member 22 in a variety of different ways and that a variety of other suitable quick release mechanism may be employed to allow for quick and easy releasable attachment of the cover member 28 with the support member 22. It is also contemplated that other fastening mechanism, such as bolt on fasteners may also be utilized as desired.

Figure 2:
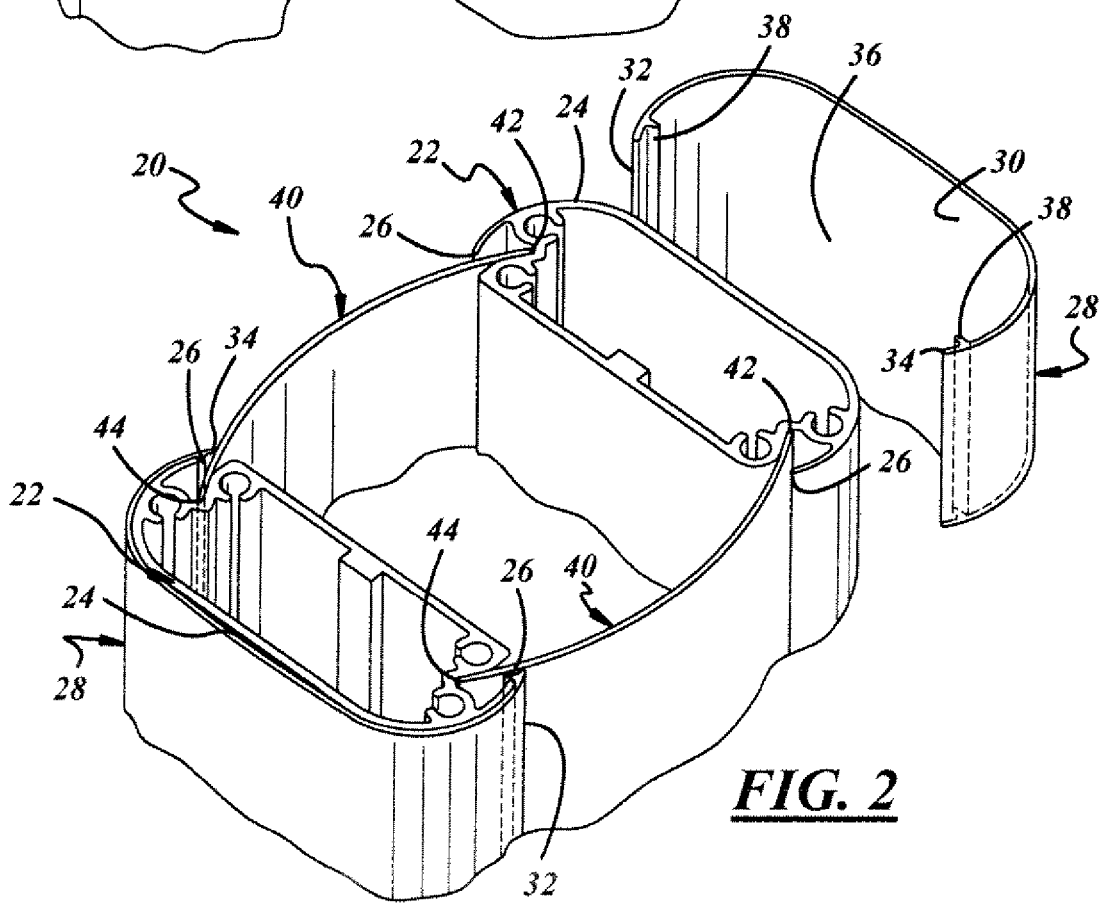
FIG. 2 is a partial perspective view of another embodiment of the present invention.

In accordance with the present invention, it may also be desirable to protect an area between two or more spaced apart support members 22. As will be understood, the open area may house various system controls, wires or other similar structures, which preferably are hidden from view. As shown in FIG. 2, a panel member 40 having a first panel side 40 and a second panel side 42 extends between and protects the area between a pair of spaced apart support members 22. The panel member 40 is preferably flat and is also constructed of a readably cleanable material. The panel member 40 can be formed with a color to match the color of the cover members 28. Alternatively, the panel member 40 can be formed of a different color. The panel material is typically plastic, but may be any suitable material known in the art. The panel color may also be any known color. The panel member 40 is also preferably flexible.

As shown in FIG. 2, the panel member 40 is readably engageable with the plurality of support members 22 to protect the area therebetween. The panel member 40 is flat and includes a first side 42 and a second side 44. In accordance with the present invention. the first side 42 is intended to engage one end 26 of one of the support members 22. The second side 44 is intended to engage the other end 26 of the other support member 22. Because the panel member 40 is flexible it allows panel member 40 to bow and bend such that the ends 26 can mate with a respective end 26 of the support member.

The cover member 40 extends between the pair of spaced apart support members 22 to cover one side of an open area between the members. Preferably, a second cover member 40 is disposed between the support members 22 to cover a second side of the open area between the members 22. This allows the area to be completely covered to protect anything disposed within the area. The panel member 40 can be constructed of any color. The panel members 40 can be easily engaged with and removed from engagement with the support members 22. This allows replacement of the old panel member 40 with a new panel member 40 having a new cover color. Typically, for aesthetics, the panel color is the same color as the skin, and the readably cleanable panel material is the same material as the readably cleanable skin material.

In addition to the panel members, a cover member 28 can be disposed over the exterior surface 24 of each of the support members 22.

The subject invention further includes a method of protecting a support member 22 having an exterior surface 24 extending between support ends or edges 26 in a vehicle wash system 20. The method begins by disposing the interior surface 30 of the cover member 28 over the exterior surface 24 of the support member 22 to protect the surface of the support member 22 from corrosion and improving the aesthetics. Next, the cover member 28 is secured onto the support member 22 with a readily releasable engagement mechanism, such as radially extending support lips 38, that engage the support ends 26 of the support member 22. It will be understood that the readily releasable engagement mechanism can engage a variety of different portions of the support member 22 as desired. Further, the engagement or securing mechanism can be formed on an interior surface 36 of the skin. Alternatively, a securing mechanism can be eliminated altogether.

The subject invention further includes a method of protecting a plurality of spaced apart support members 22 with support ends or edges 26 in a vehicle wash system 20. The method begins by mating a first end 42 of an panel member 40 with one of the support ends 26 of the support members 22. Next, a second end 44 of an panel member 40 is mated with another of the support ends 26 of the support members 22 to protect the support members 22 in the vehicle wash system 20. It will be understood that the panel can be constructed of any size and can be made to span any open area.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A vehicle wash system comprising:
a plurality of spaced apart support members, each of said plurality of support members including an exterior surface and a pair of extending edges;
a first cover member being formed of a readably cleanable material having a cover color, said cover member being readily engageable with one of said plurality of support members to protect said support member, said cover member extending longitudinally and including an interior surface extending between a first cover edge and a second cover edge to define a hollow interior, said interior surface for releasable engagement with said exterior surface of said support member;
a plurality of retention mechanism formed adjacent each of said first cover edge and said second cover edge of said cover member, each of said retention mechanism extending along said cover ends for mating with said extending edges of said support member to secure said cover member to said support member; and
a first panel member being foamed of a readily cleanable material having a first panel color, said first panel member being readily releasably engageable adjacent one of said pair of extending edges of said plurality of spaced apart support members to cover an open area formed therebetween.

2. The vehicle wash system as set forth in claim 1 wherein said cover color is the same color as said first panel color, and said readably cleanable cover material is the same material as said readably cleanable panel material.

3. The vehicle wash system of claim 1, wherein said cover color is different than said first panel color.

4. The vehicle wash system of claim 1, further comprising:
a second panel member being formed of a readily cleanable material having a second panel color, said second panel member being readily releasable adjacent one of said edges of each of said plurality of spaced apart support members to cover an open area formed therebetween, said second panel member opposing said first panel member.

5. The vehicle wash system of claim 1, wherein said first panel member has a generally rectangular shape.

6. The vehicle wash system of claim 1, wherein said first panel member is constructed of a plastic material.

7. A vehicle wash system, comprising:
a vehicle wash component, including a first support member and a second support member spaced apart from said first support member to define an open area therebetween;
said first support member and said second support member each having a base material and an outer surface terminating at a pair of terminal edges; and
a first panel member extending between said first support member and said second support member, said first panel member engaging said first support member adjacent a first support member edge and said second support member adjacent a first support member edge to cover at least a portion of said open area;
whereby said first panel member is releaseably engageable with said first support member and said second support member; said first panel member being formed of a readily cleanable material and having an outer surface with a first color;
a first cover member having an interior surface and an exterior surface, and first cover member being sized to substantially overlay said outer surface of said first support member to block fluid and debris from contacting said outer surface of said first support member, said exterior surface of said first support member being readily cleanable.

8. The vehicle wash system of claim 7, further comprising: a second panel member extending between said first support member and said second support member, said second panel member engaging said first support member adjacent a second support member edge and said second support member adjacent a second support member edge to cover another portion of said open area.

9. The vehicle wash system of claim 8, wherein said second panel member is releaseably engageable with said first support member and said second support member; said second panel member being formed of a readily cleanable material and having an outer surface with a second color.

10. The vehicle wash system of claim 9, wherein said first color of said first panel member is the same as said second color of said second panel member.

11. The vehicle wash system of claim 9, wherein said first color of said first panel member is different than said second color of said second panel member.

12. The vehicle wash system of claim 7, further comprising: a second cover member having an interior surface and an exterior surface, said second cover member sized to substantially overlay said outer surface of said second support member, said exterior surface of said second support member being readily cleanable.

13. The vehicle wash system of claim 7, wherein a first edge of said first panel member engages said first support member by snapping into a slot adjacent said first support member edge and wherein a second edge of said first panel member engages said second support member by snapping into a slot adjacent said first support member edge.

14. The vehicle wash system of claim 8, wherein a first edge of said second panel member engages said first support member by snapping into a slot adjacent said second support member edge and wherein a second edge of said second panel member engages said second support member by snapping into a slot adjacent said second support member edge.

15. A vehicle wash system, comprising:
a vehicle wash component, including a first support member and a second support member spaced apart from said first support member to define an open area therebetween;
said first support member and said second support member each having a base material and an outer surface terminating at a pair of terminal edges; and
a first panel member extending between said first support member and said second support member, said first panel member engaging said first support member in a slot adjacent a first support member edge and said second support member in a slot adjacent a first support member edge to cover at least a portion of said open area;
a second panel member extending between said first support member and said second support member, said second panel member engaging said first support member in a slot adjacent a second support member edge and said second support member in a slot adjacent a second support member edge to cover another portion of said open area;
whereby said first panel member is releaseably engageable with said first support member and said second support member; said first panel member being formed of a readily cleanable material and having an outer surface with a first color;
whereby said second panel member is releasably engagable with said first support member and said second support member, said second panel member being formed of a readily cleanable material and having an outer surface with a second color.

16. The vehicle wash system of claim 15, wherein said first color of said first panel member is the same as said second color of said second panel member.

17. The vehicle wash system of claim 16, wherein said first color of said first panel member is different than said second color of said second panel member.

18. The vehicle wash system of claim 15, further comprising:
a first cover member having an interior surface and an exterior surface, said first cover member being sized to substantially overlay said outer surface of said first support member to block fluid and debris from contacting said outer surface of said first support member, said exterior surface of said first support member being readily cleanable.

19. The vehicle wash system of claim 18, further comprising:
a second cover member having an interior surface and an exterior surface, said second cover member sized to substantially overlay said outer surface of said second support member, said exterior surface of said second support member being readily cleanable.

20. The vehicle wash system of claim 15, wherein a first edge of said first panel member engages said first support member by snapping into said slot adjacent said first support member edge and wherein a second edge of said first panel member engages said second support member by snapping into said slot adjacent said first support member edge.

21. The vehicle wash system of claim 20, wherein a first edge of said second panel member engages said first support member by snapping into said slot adjacent said second support member edge and wherein a second edge of said second panel member engages said second support member by snapping into said slot adjacent said second support member edge.

* * * * *

UNITED STATES PATENT AND TRADEMARK OFFICE
CERTIFICATE OF CORRECTION

| | | |
|---|---|---|
| PATENT NO. | : 7,784,756 B1 | Page 1 of 1 |
| APPLICATION NO. | : 12/774127 | |
| DATED | : August 31, 2010 | |
| INVENTOR(S) | : Robert J. Wentworth | |

It is certified that error appears in the above-identified patent and that said Letters Patent is hereby corrected as shown below:

Column 6, Claim 1, Line 21: "foamed" should read -- formed --.

Signed and Sealed this

Twenty-sixth Day of October, 2010

David J. Kappos
*Director of the United States Patent and Trademark Office*